United States Patent
McHugh et al.

[11] Patent Number: 5,853,865
[45] Date of Patent: Dec. 29, 1998

[54] TREATMENT OF VAPOR-GROWN CARBON FIBERS FOR FIBER-POLYMER MATRIX COMPOSITES

[75] Inventors: John Joseph McHugh, Wilmington, Del.; Gary George Tibbetts, Birmingham, Mich.

[73] Assignee: General Motors Corporation, Detroit, Mich.

[21] Appl. No.: 897,425

[22] Filed: Jul. 21, 1997

[51] Int. Cl.$^6$ ....................................................... B32B 5/06
[52] U.S. Cl. ................. 428/297.4; 428/36.4; 428/293.1; 428/367; 423/447.3; 423/447.6; 524/445; 524/496; 524/522
[58] Field of Search .............................. 423/447.1, 447.3, 423/447.4, 447.5, 447.6, 447.2; 428/367, 408, 528, 378, 902, 36, 247, 292, 290, 447.2, 359, 368, 447.1; 204/181, 292, 297; 524/495, 496, 522

[56] References Cited

U.S. PATENT DOCUMENTS

| 3,762,941 | 10/1973 | Hou | 117/93.1 |
|---|---|---|---|
| 4,272,346 | 6/1981 | Jakubowski et al. | 204/181 R |
| 4,469,138 | 9/1984 | Satoh | 138/174 |
| 4,874,800 | 10/1989 | Minamisawa et al. | 523/205 |
| 5,045,367 | 9/1991 | Bobsein et al. | 428/272 |
| 5,108,458 | 4/1992 | Marumoto et al. | 8/115.6 |
| 5,374,415 | 12/1994 | Alig et al. | 423/447.3 |
| 5,409,775 | 4/1995 | Harada et al. | 428/367 |
| 5,413,773 | 5/1995 | Tibbetts et al. | 423/447.3 |

FOREIGN PATENT DOCUMENTS

WO91/03057  3/1991  WIPO .

*Primary Examiner*—Merrick Dixon
*Attorney, Agent, or Firm*—George A. Grove

[57] ABSTRACT

Vapor-grown carbon fibers from methane produced in globular clumps of individual fibers of about 0.5 to 50 micrometers in length are rendered infiltratable and wettable with molten plastic for composite molding article manufacture by careful ball milling to reduce the clump size to a dimension of no greater than about 0.3 millimeters without reducing the average fiber length to less than about 20 percent of the original fiber length.

5 Claims, 3 Drawing Sheets

TREATMENT OF VAPOR-GROWN CARBON FIBERS FOR FIBER-POLYMER MATRIX COMPOSITES

This invention was made with United States Government support under Cooperative Agreement Award No. 70NANB5H1173 awarded by the National Institute of Standards and Technology. The United States Government has certain rights in the invention.

TECHNICAL FIELD

This invention pertains to the processing of clumps of vapor-grown carbon fibers to facilitate their infiltration with a molten polymer in the molding of fiber-polymer composites. The invention is particularly applicable to vapor-grown carbon fibers produced by pyrolysis of natural gas or methane.

BACKGROUND OF THE INVENTION

At the present state of development of carbon fiber technology, the term "carbon fibers" includes fibers produced by a variety of processes that result in carbon fibers of different sizes, properties and processing characteristics. Carbon fibers, regardless of source, are often used to increase the stiffness and strength and/or thermal or electrical conductivity of light-weight composites commonly used in aerospace, recreation and industrial applications. It is often desirable to use the fibers in a thermoset or thermoplastic polymer matrix.

The largest volume of commercial carbon fibers is produced by the pyrolysis of long polyacrylonitrile, pitch or rayon fibers. Such filamentary products are usually composed of more than 90 percent by weight carbon and have a diameter of about five to ten micrometers. Sometimes such carbon fibers are processed so that they are in the form of graphite.

In the production of carbon or graphite fibers from a polymer filament, one starts with a suitable polyacrylonitrile, pitch or rayon and produces a continuous fiber by a spinning operation. The fiber is then oxidized, carbonized and perhaps subjected to a graphitization reaction to form the carbon or graphite fibers. Often, such fibers are given a surface treatment and a sizing (coating). As produced, such carbon fibers are very long, and they are chopped to a suitable length which may vary from a few millimeters to a few centimeters or longer in the case of pultruded or fiber wound composite articles.

In addition to the polymer fiber-derived carbon fibers, there is a broad class of small carbon fibers (sometimes called fibrils) which are produced by contacting fine metal-containing particles with a suitable carbon-containing gaseous organic compound at pyrolytic temperatures (for example, 650° C. to 1200° C.) and at a pressure of, for example, 0.1 to 10 atmospheres. The metal-based compounds are typically based on iron, cobalt or nickel, and the carbon-containing gases or vapors broadly include aromatic hydrocarbons such as benzene, toluene and xylene; hydrocarbon gases such as methane, ethane, propane and ethylene; and oxygen-containing hydrocarbons such as formaldehyde, acetone and methanol. Depending upon the carbon source and the process, different subgroups of very small carbon filaments can be produced. Where it is intended to use such small carbon filaments as, for example, a reinforcing or conductivity providing fiber in a polymeric composite, the processing issues vary because the size and processability of the filaments vary.

One group of vapor-grown carbon fibers may be produced catalytically on metallic (typically iron) particles from natural gas or methane. Practices for the production of such fibers from natural gas are described in U.S. Pat. Nos. 5,374,415 and 5,413,773, assigned to the assignee of the subject invention. Briefly speaking, a stream of methane or natural gas is introduced into a flow reactor. The methane-containing stream may also contain a small amount of hydrogen sulfide and ammonia. Also introduced into the stream is an iron-containing compound such as iron carbonyl [$Fe(CO)_5$] which decomposes in the hot stream to provide growth sites for carbon deposits from hydrocarbon compositions. The pyrolysis reaction is carried out at atmospheric pressure over a period of a few minutes at a temperature of about 1000° C. to 1200° C.

The resulting carbon fibers, depending upon the reactor conditions, typically have a length of, for example, 0.5 to 50 micrometers and a diameter in the range of 100 to 300 nanometers. The temperature, pressure and residence time in the reactor can affect the size of the fibers as well as the presence of intermediate decomposition products of the natural gas constituents on the fiber surfaces.

So many of the relatively long fibers are grown simultaneously in the reactor that they become entertwined as they are blown through the reactor. Furthermore, the carbon vapor deposition which then ensues tends to glue the fibers firmly together in clumps.

Where it is desirable to employ such fibers as a reinforcing, coefficient of expansion diminishing or conductivity-enhancing material, it is necessary to wet the individual fibers by infiltrating the clumps with a viscous polymeric medium. The medium may be a molten thermoplastic polymer or a liquid precursor of a thermoset polymer. For example, it may be desired to prepare a thermoplastic composite body of nylon 6,6 or polypropylene reinforced with such vapor-grown carbon fibers. However, as stated, it has proven difficult to infiltrate the clumps of fibers with molten nylon or polypropylene or other viscous polymeric medium.

Accordingly, it is an object of the present invention to provide a method of treating the clumps of pyrolized methane-carbon fibers for inclusion in a molten polymer mass in the molding of a polymer-fiber reinforced composite. The methane source carbon fibers are relatively inexpensive and have desirable properties which justify the effort of treating the clumps of the fibers for this purpose. In some cases, even though the tensile properties of the resulting composite are little improved, fiber addition may be beneficial because the thermal or electrical conductivity or the expansion coefficient may be improved.

SUMMARY OF THE INVENTION

This invention is a practice for treating clumps of very small carbon fibers produced in an iron particle catalyzed pyrolysis of a natural gas or methane stream. In a typical flow reactor in which such fibers are produced, the product fiber leaves the reactor in the form of tenacious fiber clumps that may be up to several centimeters in diameter. The clumps are formed of individual carbon (largely graphite) fibers that have individual lengths in the range of about 0.5 micrometers to 50 micrometers and individual diameters in the range of 100 to 300 nanometers. In a particular reaction batch, the average length of the fibers may, for example, be about 18 micrometers with an average diameter of about 200 nanometers. However, as stated, the fibers are in the form of tightly adherent globular clumps that are difficult to process in molten polymers. The apparent density of the fibers is of the order of 0.01 grams per cm$^3$.

After futile efforts to beneficially infiltrate the clumps of methane-grown fibers with molten nylon or polypropylene, it was hypothesized that if the clumps could be made smaller, complete polymer wetting might be accomplished. Ball milling of the clumps was tried almost without success. It is discovered that extensive ball milling so breaks up the fibers or fiber clumps that the reinforcing capability of the comminuted fibers may be reduced rather than improved. Fortunately, it was discovered that careful control of the milling operation yielded material suitable for useful polymer composites. In accordance with the invention, it is found that gentle and careful mechanical comminution, preferably gentle ball milling, of the fiber clumps to reduce the size of the clumps to about 0.3 millimeters produces agglomerations of the small methane source carbon fibers that may be suitably wetted by a molten polymer matrix material and can be molded into composite bodies for good composite properties including increased conductivity with improved tensile stiffness and strength. In addition to reducing the clump size to no greater than 300 micrometers, it is preferred that the average length of the fibers not be reduced substantially below 20% of their original average length.

Other objects and advantages of the invention will become more apparent from a detailed description thereof which follows. Reference will be had to the drawings in which:

DESCRIPTION OF THE PREFERRED EMBODIMENT

Figure 1:
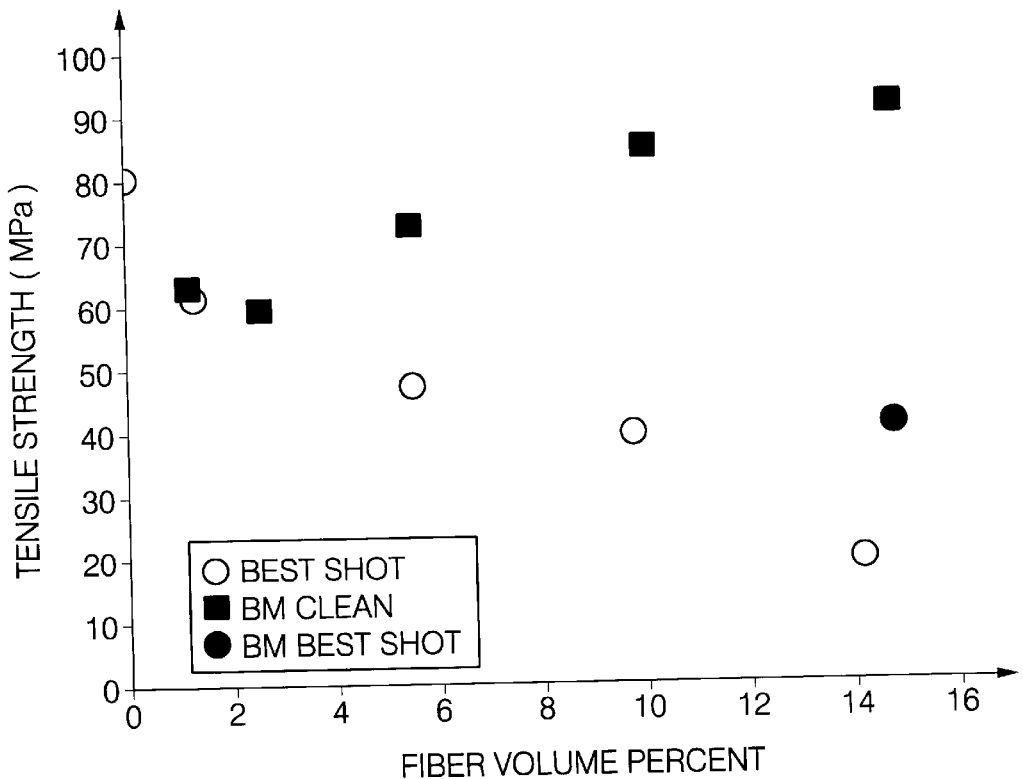
FIG. 1 is a graph showing the effect of fiber content on tensile strength (MPa) for methane vapor-grown carbon fiber/nylon 6,6 composites.

Vapor-grown carbon fibers (VGCF) may be produced catalytically on metallic (mostly iron) particles from gaseous hydrocarbons using a technique described, for example, in the above-identified patents U.S. Pat. No. 5,374,415 and U.S. Pat. No. 5,413,773. Although transmission electron microscopic observations show that the fibers are quite graphitic, they are too small for direct measurement of mechanical properties. However, direct measurements on fibers grown to macroscopic dimensions (which, because of their greater pyrolytic carbon coating, should be less graphitic than their microscopic counterparts) yielded good values: a strength of 2.92 GPa and a tensile modulus of 240 GPa. Accordingly, there is interest in adapting methane grown carbon fibers for polymer composite reinforcement.

However, in the most practical production mode, the fibers flow through the reactor with the feedstock gas and emerge with an average diameter of about 0.2 $\mu$m in a highly entangled globular state. Furthermore, the bulk density of the product mass is very low. For these reasons, conventional composite fabrication techniques are difficult to apply to such iron particle-methane grown fibers.

A few workers have coped with these difficulties to produce viable composite materials. Dasch, Baxter, and Tibbetts, 21st Bienn. Conf. on Carbon, Buffalo, N.Y., 82 (1993), reported on the properties of compression molded VGCF reinforced polycarbonate. Their measurements showed that adding 20 vol % fibers did not improve the tensile strength, but approximately doubled the flex modulus.

Recently, Carniero et al, submitted to *Comp. Sci. Technol.*, also studied VGCF/polycarbonate composites. They utilized a co-rotating twin screw Leistritz extruder and a Ton Klockner Ferromagnetic injection molder operating near 2 MPa injection pressure. By reinforcing the polycarbonate with 20 vol % fibers, they were able to increase the tensile strength by 19% and the modulus by 72% above the values for unreinforced resin. Disappointingly, these numbers were only marginally above those for carbon black reinforced materials; moreover, the impact strengths of the 20% loaded composites decreased by 90%, suggesting that the composites might be too fragile for many applications. These results are consistent with poor fiber-matrix adhesion.

The following disclosure will show that VGCFs can be used to fabricate thermoplastic composites with excellent properties.

The nylon 6,6 used in this study was DuPont Zytel 103 HSL, in pellet form. It was vacuum baked immediately before use at 90° C. for eight hours to remove absorbed water. The polypropylene, Montel Pro-Fax 6301, in flake form, was not baked before use due to its lesser tendency to absorb water.

Most of the fibers used in this study were produced at the pilot plant of Applied Sciences, Inc., in Cedarville, Ohio. They were approximately 0.2 $\mu$m in diameter and were formed by iron-based catalyst particles in a methane atmosphere [the above patents and Tibbetts, et al, *Carbon* 32, 569 (1994)].

Three slightly different growth procedures and three different methods of surface treatment were used: "Best Shot" fibers were produced under a rapid flow condition which maximized fiber production rate but left several monolayers of poly-aromatic hydrocarbons condensed on the fiber surface. "Clean" fibers were fabricated at a lower flow rate and had a much cleaner surface than the "Best Shot", perhaps about one monolayer of adsorbed hydrocarbons. "GMR Baked" fibers were produced at the General Motors Corporation Research & Development Center by a formula resembling that used for "Clean" fibers and subsequently heated in flowing nitrogen at 500° C. to remove most condensed material and provide an improved surface. "Air-etched" fibers were "Best Shot" fibers heated to 500° C. for 20 minutes in flowing air to burn off adsorbed hydrocarbons. "Stripped" fibers were "Best Shot" fibers pyrolytically stripped in flowing nitrogen at 1000° C. "$CO_2$ Etched" fibers were "Best Shot" fibers post treated in flowing $CO_2$ at 900° C. for 20 minutes.

Ball milling was carried out using a Spex 8000™ mixer mill as follows: First, 0.81–0.84 g of fibers were weighed and compressed, if necessary, into a 100 ml beaker. Then two ⅛" and one ½" steel balls (or ten ⅛" plastic balls) were placed in the ball mill vessel's smaller (lid) section, with fibers laid loosely on top to fill the section. Any remaining fibers were placed in the larger milling section of the vessel. It was then possible to invert this section and hand-screw the two pieces together, after which the vessel was fastened in the mill.

Because the initial motion and effect of the balls is determined by the compression and bulk density of fibers in each section of the vessel, suitable care was taken to fill the mill's vessel in a similar manner for each sample. For example, even though it might be more efficient to add more than 0.84 g of fibers to the mill, this volume of low density material could be sufficient to restrict the ball motion so that the shaking of the mill would have insufficient effect on the fibers. The value of 0.81–0.84 g was found to be the maximum that could be added and still achieve reproducible results.

Injection molding of mini-tensile specimens (ASTM Test Method D638 Type V) using VGCF/nylon and VGCF/polypropylene was performed using a benchtop CSI Mini-MAX Molder (Custom Scientific Instruments, Cedar Knolls, N.J.). The apparatus is equipped with a rotor-injection plunger which may be submerged in a 12.7 mm diameter heated pre-mixing cup. This is separated from a removable mold cavity by a valve. Mixing in the cup is imparted by the rotary as well as by the vertical motion of the rotor. As with the ball-milling experiments, extreme care was used to employ a mixing procedure which could be used for all samples. Samples with high fiber fractions required as much as 10 minutes to mix because the bulky fibers had to be gradually added to the melt in order not to overflow the cup. Samples with a low fiber fraction were subjected to the same thermal regimen.

The mixing cup temperature was maintained at 310° C. for nylon and 230° C. for polypropylene. The mold was held at 200° C. for nylon and at room temperature (23° C.) for polypropylene samples to inhibit crystallization. In the case of polypropylene, to keep the mold temperature as low as possible the mold was not secured below the cup until immediately before injection. Injection was achieved by opening the valve below the cup and pulling sharply downward on the lever attached to the mixing rotor. For all polypropylene or VGCF/polypropylene samples, the mold was immediately submerged in cold water for at least 5 minutes to minimize crystal growth during solidification. The mold cavity is configured to produce a 2.54 cm long "dogbone" tensile test specimen The resulting specimens were mounted in the grips of an MTI tensile testing machine and stretched at 1 mm/min until failure occurred. The modulus was determined from the slope of the initial section of the stress-strain curve, while the tensile strength was determined from the ultimate load before separation of the two sections of the 2.54 cm dogbone.

In order to determine the average lengths of fibers present in the nylon composites, the matrix was dissolved with trifluoroethanol, and the residue examined in a scanning electron microscope. The SEM sample was made as follows: First, an "Avery Glue Dot" [Avery Dennison, Diamond Bar, Calif.] was squeezed onto an aluminum sample stub and then scraped off with forceps to leave an area of adhesive so thin that fibers could not submerge in it. Next, a small wad of fibers held in a pair of forceps was scraped over the adhesive area to disperse and spread the individual fibers. Gold was then sputter deposited on the stub to make it conductive. From micrographs of regions where the fibers were well dispersed, the lengths of at least 50 fibers were measured and averaged.

Polypropylene was less successfully extracted with hot toluene or ortho dichlorobenzene, as the solvents did not completely dissolve the plastic, but the same SEM procedure could be used.

As-Grown Fibers

Figure 2:
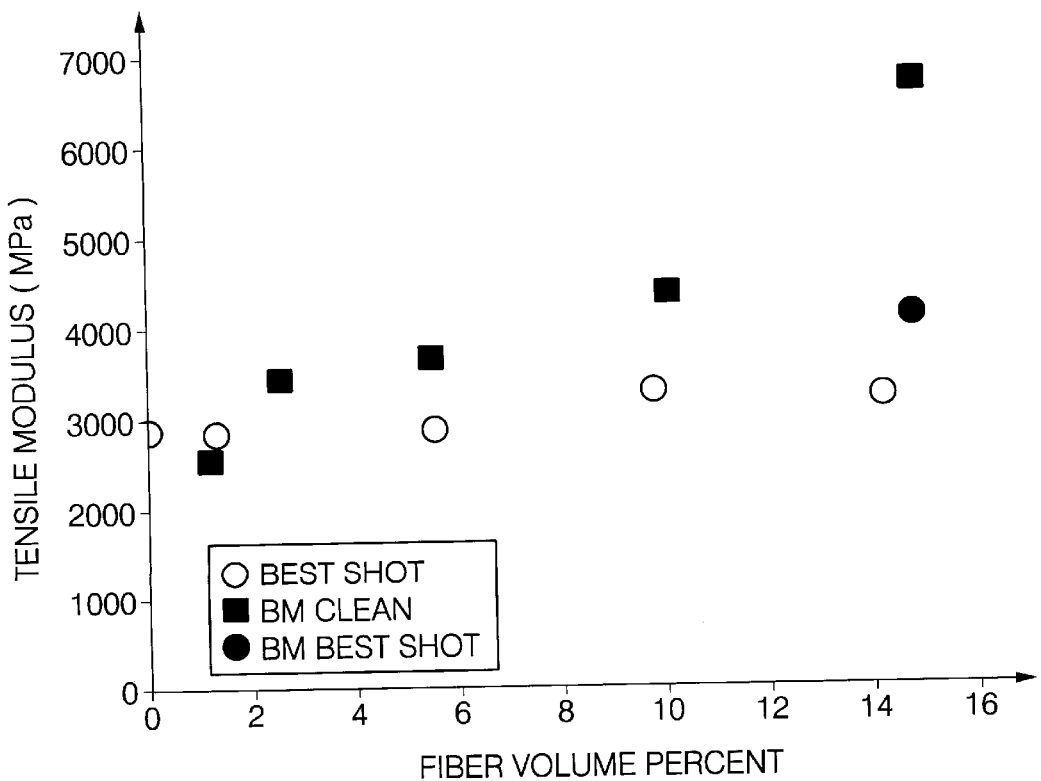
FIG. 2 is a graph showing the effect of fiber content on tensile modulus (MPa) for methane vapor-grown carbon fiber/nylon 6,6 composites.

FIGS. 1 and 2 illustrate the dependence of tensile strength and modulus, respectively, on fiber content for "Best Shot" carbon fibers in nylon (open circles). The tensile strength of unfilled nylon was about 80 MPa. Its unfilled tensile modulus was about 2800 MPa. It is apparent that the tensile strength of the fiber-filled nylon decreases significantly with increasing fiber fraction, but the tensile modulus appears largely unaffected by the addition of fibers. Other results (not shown) indicate only a slight improvement when fibers with a cleaner surface are used.

The maximum fiber loading obtainable was 14 vol %. This was a consequence of the very low density of the fibers, which made it difficult to load a large mass in the cup. Moreover, once a dry clump of fibers was compressed during the mixing process, it became even more difficult to infiltrate with polymer.

SEM observation of the fracture surfaces showed that even though the nylon did adhere fairly well to the "Best Shot" fibers, some regions of the surface had extensive uninfiltrated fiber areas.

Figure 3:
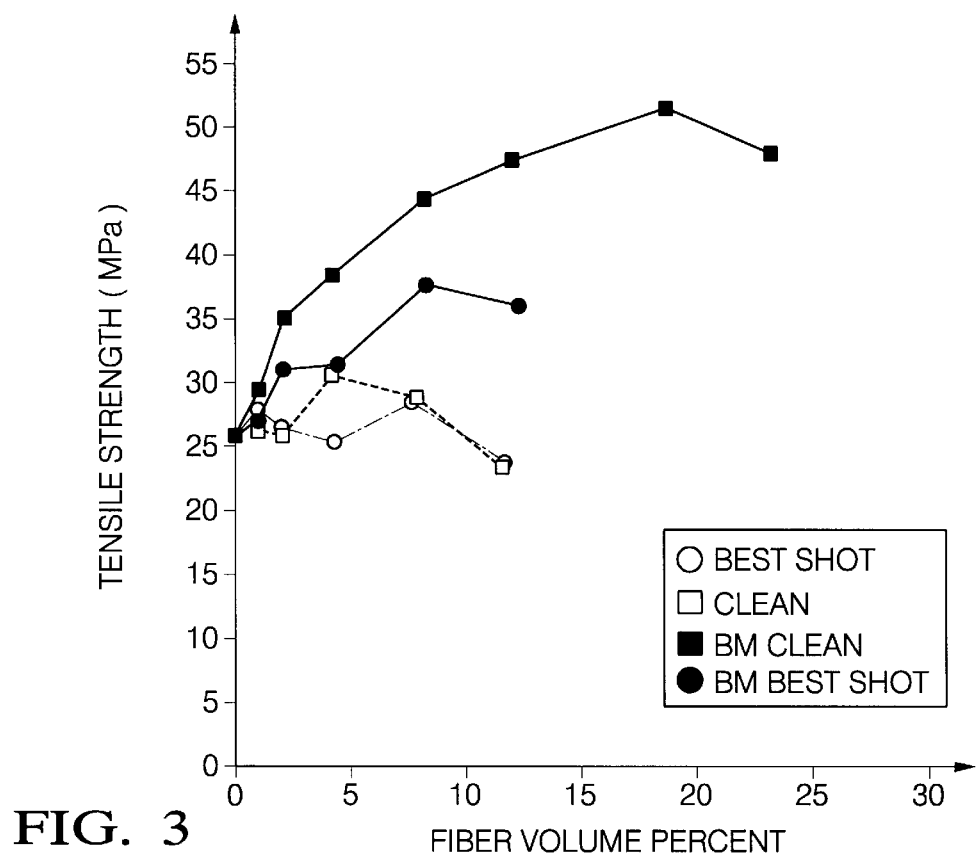
FIG. 3 is a graph showing the effect of fiber content on tensile strength (MPa) for methane vapor-grown carbon fiber/polypropylene composites.
Figure 4:
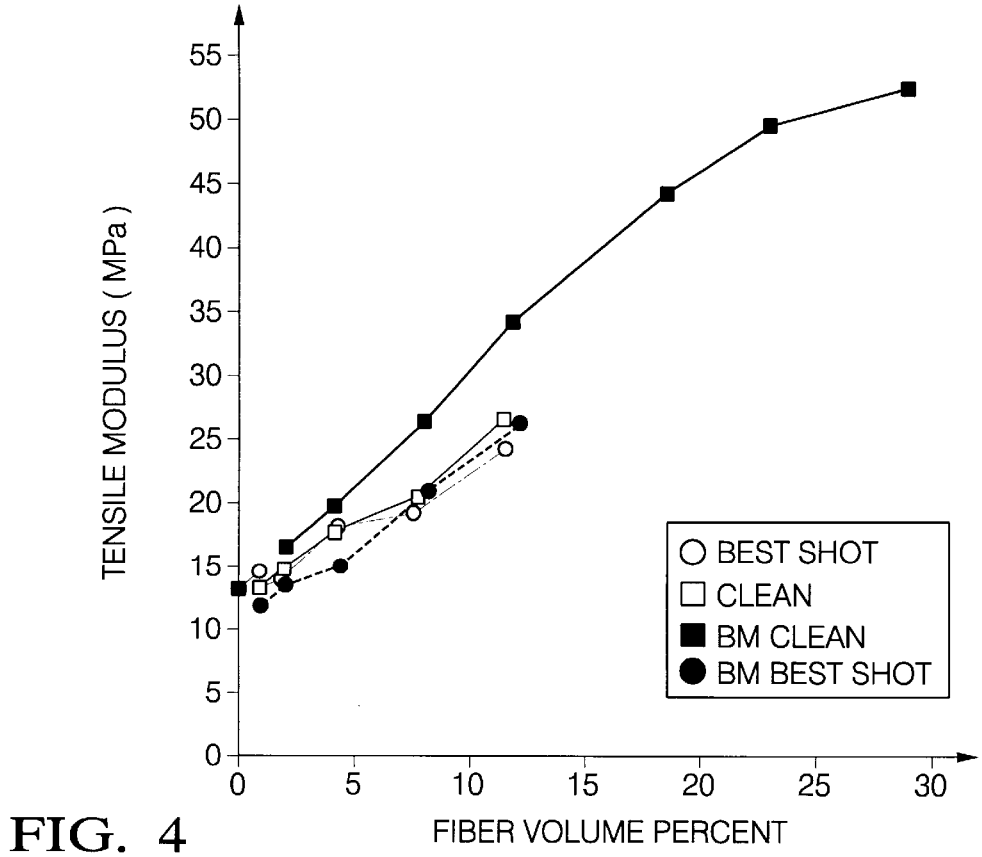
FIG. 4 is a graph showing the effect of fiber content on tensile modulus (MPa) for methane vapor-grown carbon fiber/polypropylene composites.

The results for VGCF/polypropylene composites were more encouraging. The tensile strength and modulus of the unfilled polypropylene were 26 MPa and 1250 MPa, respectively. FIG. 3 shows that the tensile strength remained approximately constant as "Best Shot" or "Clean" (open circles or squares, respectively) fiber volume fraction was increased, without the sharp decrease shown by nylon. Furthermore, FIG. 4 shows that the addition of 11.5 vol % fibers approximately doubled the tensile modulus of pure polypropylene. These improvements are attributed to the lower processing viscosity obtained with polypropylene at 230° C. compared to nylon. Nylon could not be heated to a temperature where its viscosity was comparably low, as the melt began to decompose above 310° C. As in the nylon composites, little improvement could be seen in the properties of samples made from fibers with cleaner as compared with hydrocarbon covered surfaces.

SEM observation of the polypropylene fracture surfaces showed (as for nylon) that the resin did adhere fairly well to the "Clean" fibers, but that some regions of the surface had extensive uninfiltrated fiber regions.

Ball Milling Optimization

An investigation was made to determine if ball milling of the as-grown fiber clump would aid infiltration of the fibers by molten polymers. The use of steel milling balls represented a relatively vigorous milling operation, while the use of plastic balls represented a milder operation.

It was found that ball milling broke up the large clumps of fibers very effectively. Scanning electron micrographs of the ball milled material showed that the fiber clumps, which in the as-produced "clean" material were more than a millimeter in diameter, were broken up after one minute into remarkably uniform clumps smaller than 1 mm and smaller than 0.2 mm after two minutes. The uniform reduction in clump size continued down to 0.05 mm at 10 minute ball milling duration. This suggests that the severity and length of the milling process is critical.

Figure 5:
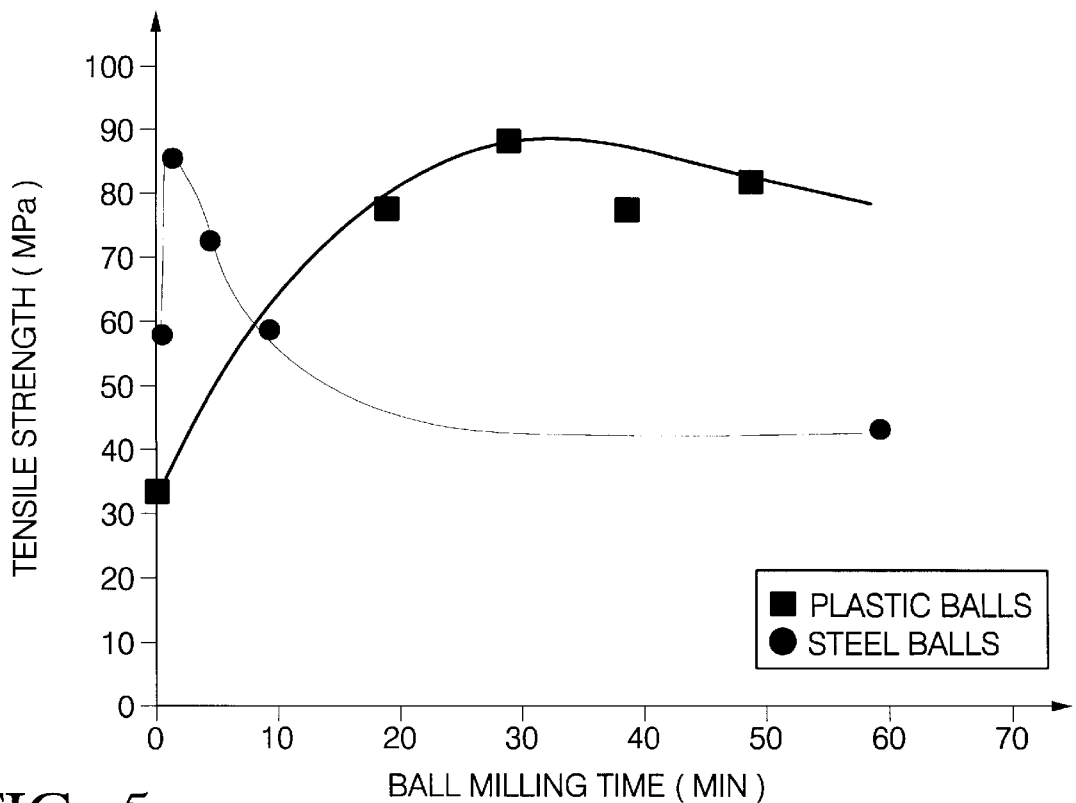
FIG. 5 is a graph showing the effect of ball milling time with both steel and plastic balls on the tensile strength (MPa) of 14 volume percent methane-grown carbon fiber reinforced nylon 6,6.
Figure 6:
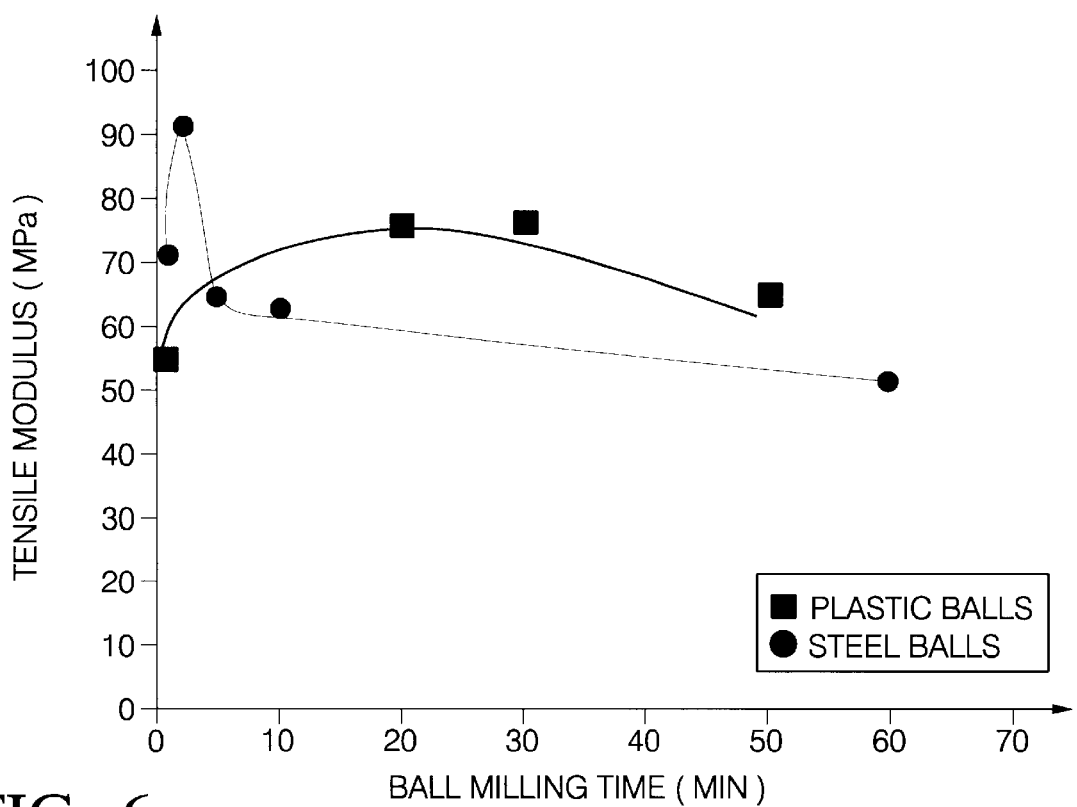
FIG. 6 is a graph showing the effect of ball milling time with both steel and plastic balls on the tensile modulus (MPa) of 14 volume percent methane-grown carbon fiber reinforced nylon 6,6.

FIGS. 5 and 6 show the effect of ball milling time on the mechanical properties of 14 vol % nylon composites made from clean carbon fibers. It is encouraging that after two minutes of steel ball milling time, the tensile strength nearly tripled (compared to the 14 vol % VGCF/nylon results shown in FIG. 1), while modulus nearly doubled (FIG. 2). It is, however, daunting to note how sensitive the improvement in both strength and stiffness is to ball milling duration. Both properties diminish appreciably during further ball milling.

Scanning electron microscopy at higher magnification clearly revealed the reason the mechanical properties declined for ball milling times greater than two minutes. SEM shows that the innately long fibers (about 18 micrometers average) are appreciably shortened after only one minute of ball milling. Continued milling further decreases the fiber length until it is only about three times the diameter (length 600 nm, diameter 200 nm) after 60 minutes of ball milling. Standard models for fiber-filled composites predict a strong decrease in the modulus as reinforcing fibers decrease in length.

Optimal ball milling time proved to be dependent on the initial fiber bulk density and clump size. For example, it has been determined that it is 2.75 minutes for the "Best Shot" fibers and 1.25 minutes for the "Air-etched" fibers as compared to about two minutes for "Clean" fibers.

Ball Milled Fibers

A series of nylon composites was produced with the two minute steel ball milled "Clean" (BM Clean) material. FIGS. 1 and 2 show the substantial improvement in mechanical properties of these composites (filled squares). The tensile strength of these composites rose with fiber volume, reaching a value more than 10% greater than that of the neat resin at 15 vol % loading. Modulus increased until it more than doubled near 15 vol %. A few experiments with "Air-etched" fibers gave substantially inferior results than the "Clean" batch, while one sample of "Best Shot" material (BM Best Shot, filled circle) gave worse results yet.

The data for the tensile strength of two minute ball milled "Clean" and "Best Shot" fibers in polypropylene (BM Best Shot and BM Clean, filled circles and squares) are shown in FIG. 3. Once again the results were markedly better than with the unprocessed fibers, as the ball milled fibers were made into composites with double the tensile strength of the neat polypropylene. Part of the improvement stemmed from the fact that the denser ball milled material could be used to make a higher volume fiber fraction than achievable with the as-grown fibers. As with nylon, the "Air-etched" fibers on average gave results somewhat inferior to the "Clean" or "$CO_2$ Etched" fibers, while the results for the "Best Shot" fibers were clearly below those of the "Clean" fibers.

Measurements of two minute ball milled "Clean" fibers obtained from both nylon and polypropylene composites gave a surprisingly short average length of 3.6 $\mu$m, corresponding to 1/d=19.1. Thus, the two minute steel ball milling reduced the length of the as-grown fibers, 18 $\mu$m average, to about 20% of the original length.

Effect of Surface Treatments

Composites made with ball milled fibers showed definite improvements in mechanical properties. Since their strength and modulus were not limited by uninfiltrated areas, these composites were more sensitive to fiber-matrix coupling and, ultimately, to fiber surface condition. The data for polypropylene tensile strength and modulus in FIGS. 3 and 4 clearly illustrate this improved surface sensitivity.

In fact, experimental results show an identical ordering of the surface treatments. "Best Shot" fibers were clearly inferior to any of the surface treated fibers. The "Clean" fibers gave results marginally better than "Air-etched"; while the "$CO_2$ Etched" fibers possibly gave results very slightly better than "Clean". Perhaps a conservative appraisal of the data would conclude that "Best Shot" fibers had worse properties than any of the other three types, with the remaining three indistinguishably close.

These results seem to indicate that, at least for polypropylene, large concentrations of surface aromatics make it difficult for the matrix to adhere to the fibers. It seems reasonable to expect that strongly air etching these fibers could remove these aromatics, yet could begin to compromise fiber mechanical properties. Air-etching of carbons is a risky surface treatment to be performed with care. $CO_2$ etching could be expected to be a much less destructive process. Finally, fibers covered with low concentrations of aromatics made polypropylene composites with significantly better mechanical properties than did fibers whose surfaces were heavily coated with aromatics. Most significantly, it does not seem to be necessary to remove the last vestiges of surface aromatics to approach optimum composite properties. It is sufficient to remove all but a final monolayer. The agreement of the data for composites made with cleaned VGCF with calculations for fibers with the mechanical properties of this VGCF might even allow us to speculate that further improvements in composite properties due to more advanced surface treatments will be marginal.

The data for nylon composites generally agree with the polypropylene data. The "Best Shot" data shows marginal improvement in tensile strength and modulus due to ball milling, while the "Clean" VGCF show a substantial improvement. As in the case of polypropylene, the "Air-etched" fibers lie in between these two extremes, but in the nylon tensile strength data the "Air-etched" results lie far below the "Clean" data. Perhaps this indicates an actual change in VGCF/nylon bonding at the etched surfaces.

Summary

Efforts to make VGCF composites with fibers in the clumped (as grown) condition gave composites plagued with inadequately infiltrated fibers having at best marginally improved mechanical properties. These difficulties seemed more formidable with nylon than with polypropylene. This infiltration effect overshadowed any influence of fiber surface condition on the composite properties.

However, careful ball milling of the as-grown clumped fibers which broke up the fiber clumps to less than 300 $\mu$m in diameter substantially improved the properties of both nylon and polypropylene composites. VGCF/nylon had a slight improvement in tensile strength and a doubling of the resin's modulus, while VGCF/polypropylene doubled the tensile strength of the neat resin and quadrupled the modulus. Moreover, the composites were sufficiently improved that differences in fiber surface preparation became important. "Best Shot" fibers covered with substantial quantities of aromatics made composites with mechanical properties significantly poorer than did fibers which were air or $CO_2$ etched, or simply produced with a minimum of surface hydrocarbons (i.e., "Clean" fibers). The differences among the members of the latter group are relatively small and may indicate that further substantial improvements from improved surface treatments may be marginal. Both the tensile strength and the modulus of the composites made with clean fibers exceed theoretical values for composites made with fibers randomly oriented in three dimensions, indicating that the injection molding process orients the fibers somewhat.

Thus, this invention gives the designers and producers of short carbon fiber composites the useful option of employing low cost methane vapor-grown carbon fibers. The methane-grown fibers may, at the least, be employed in thermally or electrically conductive polymer composites without sacrifice of the physical properties of the base polymer.

By carefully ball milling or otherwise comminuting the as-grown fiber clumps from a millimeter or centimeter size to a diameter of about 300 micrometers or slightly less, the smaller fiber clumps can be infiltrated with thermoplastic resins to form useful composites. The best physical properties are obtained when the fibers are produced with no more than a monolayer of polyaromatic hydrocarbon molecules or subjected to a cleaning operation to remove any excess aromatic material.

In addition to controlling the intensity of the comminution step so that the clumps of natural gas- or methane-grown carbon fibers are reduced to a diameter or largest dimension of about 300 micrometers, it is also preferred that the original length of the fibers be reduced no more than about 80%.

While the invention has been described in terms of a few specific embodiments, it is apparent that other forms could be adapted by those skilled in the art. The scope of the invention is limited only by the scope of the following claims.

We claim:

1. A method of treating carbon fibers for incorporation into a molten polymer for molding into a composite comprising said fibers within a matrix of said polymer, said fibers having been produced by iron base particle catalyzed vapor phase pyrolysis of natural gas or methane such that the product fibers are contained in multi-fiber globular clumps up to several centimeters in diameter, said fibers further being characterized by typical individual fiber lengths in the range of about one-half micrometer to about 50 micrometers and typical individual fiber diameters in the range of about 0.1 to about 0.3 micrometers, said clumps being resistant to infiltration by said molten polymer for the molding of a said composite, said method comprising mechanically breaking up said clumps to a diameter of about and generally not exceeding 300 micrometers and thereafter infiltrating said clumps with said molten polymer.

2. A method as recited in claim 1 whereby said mechanical breaking up of the clumps is accomplished by ball milling for a period of minutes so as to reduce the diameter of the clumps to said value without reducing the length of said fibers to less than 20 percent of the original average length.

3. A method as recited in claim 1 in which said polymer is nylon.

4. A method as recited in claim 1 in which said polymer is polypropylene.

5. A method as recited in claim 1 in which said fibers are cleaned to remove aromatic hydrocarbons from the surface thereof prior to said breaking up step.

\* \* \* \* \*